(12) United States Patent
Chandra et al.

(10) Patent No.: US 7,484,003 B2
(45) Date of Patent: Jan. 27, 2009

(54) METHOD AND APPARATUS FOR MULTIPLE CONTEXTS AND LAYER 3 VIRTUAL PRIVATE NETWORKS

(75) Inventors: Ravi Chandra, Los Gatos, CA (US); Enke Chen, San Jose, CA (US); Jenny Yuan, San Jose, CA (US)

(73) Assignee: Redback Networks Inc., San Jose, CA (US)

( * ) Notice: Subject to any disclaimer, the term of this patent is extended or adjusted under 35 U.S.C. 154(b) by 704 days.

(21) Appl. No.: 09/991,234

(22) Filed: Nov. 17, 2001

(65) Prior Publication Data

US 2003/0112799 A1  Jun. 19, 2003

(51) Int. Cl.
G06F 15/173 (2006.01)
G06F 11/00 (2006.01)
H04L 12/28 (2006.01)

(52) U.S. Cl. .............. 709/242; 709/223; 709/238; 370/238; 370/351

(58) Field of Classification Search ............ 709/220, 709/238, 242; 370/392
See application file for complete search history.

(56) References Cited

U.S. PATENT DOCUMENTS

| | | | | |
|---|---|---|---|---|
| 5,517,620 A * | 5/1996 | Hashimoto et al. | ........... | 709/242 |
| 5,802,316 A * | 9/1998 | Ito et al. | ........... | 709/249 |
| 5,916,306 A * | 6/1999 | Ruiz | ........... | 709/242 |
| 6,226,751 B1 * | 5/2001 | Arrow et al. | ........... | 713/201 |
| 6,339,595 B1 * | 1/2002 | Rekhter et al. | ........... | 370/392 |
| 6,421,731 B1 * | 7/2002 | Ciotti et al. | ........... | 709/238 |
| 6,463,061 B1 * | 10/2002 | Rekhter et al. | ........... | 370/392 |
| 6,496,510 B1 * | 12/2002 | Tsukakoshi et al. | ........... | 370/401 |
| 6,526,056 B1 * | 2/2003 | Rekhter et al. | ........... | 370/392 |
| 6,553,423 B1 * | 4/2003 | Chen | ........... | 709/230 |
| 6,609,153 B1 | 8/2003 | Salkewicz | | |
| 6,662,221 B1 * | 12/2003 | Gonda et al. | ........... | 709/223 |
| 6,704,795 B1 * | 3/2004 | Fernando et al. | ........... | 709/237 |
| 6,891,793 B1 * | 5/2005 | Suzuki et al. | ........... | 370/217 |
| 6,990,103 B1 * | 1/2006 | Gollamudi | ........... | 370/395.31 |
| 7,039,720 B2 * | 5/2006 | Alfieri et al. | ........... | 709/242 |
| 7,068,661 B1 * | 6/2006 | Watt et al. | ........... | 370/395.31 |

(Continued)

FOREIGN PATENT DOCUMENTS

WO    PCT/US02/36832    11/2002

(Continued)

OTHER PUBLICATIONS

Wilder, Rick et al., Chairs, "Layer 3 Virtual Private Networks (l3vpn)" Charter. Last modified Sep. 20, 2005, 4 pages. l3vpn@ietf.org.

(Continued)

*Primary Examiner*—John Follansbee
*Assistant Examiner*—Kamal Divecha
(74) *Attorney, Agent, or Firm*—Blakely, Sokoloff, Taylor & Zafman, LLP

(57) ABSTRACT

A method an apparatus for multiple contexts and layer 3 virtual private networks is described. A method comprises providing a layer 3 virtual private network (VPN) to a first customer; providing backbone access to a second customer; and maintaining on a single network element a first set of information for the first customer separately from a second set of information for the second customer.

9 Claims, 14 Drawing Sheets

U.S. PATENT DOCUMENTS

| | | | |
|---|---|---|---|
| 7,095,740 B1 * | 8/2006 | Jagannath et al. | 370/392 |
| 2001/0016914 A1 * | 8/2001 | Tabata | 713/201 |
| 2001/0050914 A1 * | 12/2001 | Akahane et al. | 370/382 |
| 2002/0090089 A1 * | 7/2002 | Branigan et al. | 380/270 |
| 2002/0156828 A1 * | 10/2002 | Ishizaki et al. | 709/201 |
| 2003/0041136 A1 * | 2/2003 | Cheline et al. | 709/223 |

FOREIGN PATENT DOCUMENTS

| | | |
|---|---|---|
| WO | PCT/US02/36832 | 2/2003 |

OTHER PUBLICATIONS

Rosen, E., et al., RFC 2547 entitled "BGP/MPLS VPNs" Mar. 1999, Copyright The Internet Society. 24 pages.

Kirton, Paul, RFC 911 entitled "EGP Gateway Under Berkeley Unix 4.2" Aug. 22, 1984, 20 pages. University of Southern California, Information Sciences Institute Visiting Research Fellow from Telecom Australia Research Laboratories.

* cited by examiner

METHOD AND APPARATUS FOR MULTIPLE CONTEXTS AND LAYER 3 VIRTUAL PRIVATE NETWORKS

BACKGROUND OF THE INVENTION

1. Field of the Invention

The invention relates to the field of communication. More specifically, the invention relates to communication networks.

2. Background of the Invention

Virtual Private Networks (VPNs) extend an entity's (e.g., a corporation, Internet Service Provider (ISP), etc.) network backbone out to the Internet. The connectivity costs for VPNs are less than leasing a line, and fault tolerance is improved because of multiple pathways between sites. Instead of an entity purchasing, administrating and maintaining additional network elements (e.g. routers, hubs, switches, subscriber management systems, etc.), an entity can securely transmit traffic through the Internet with VPNs.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1:
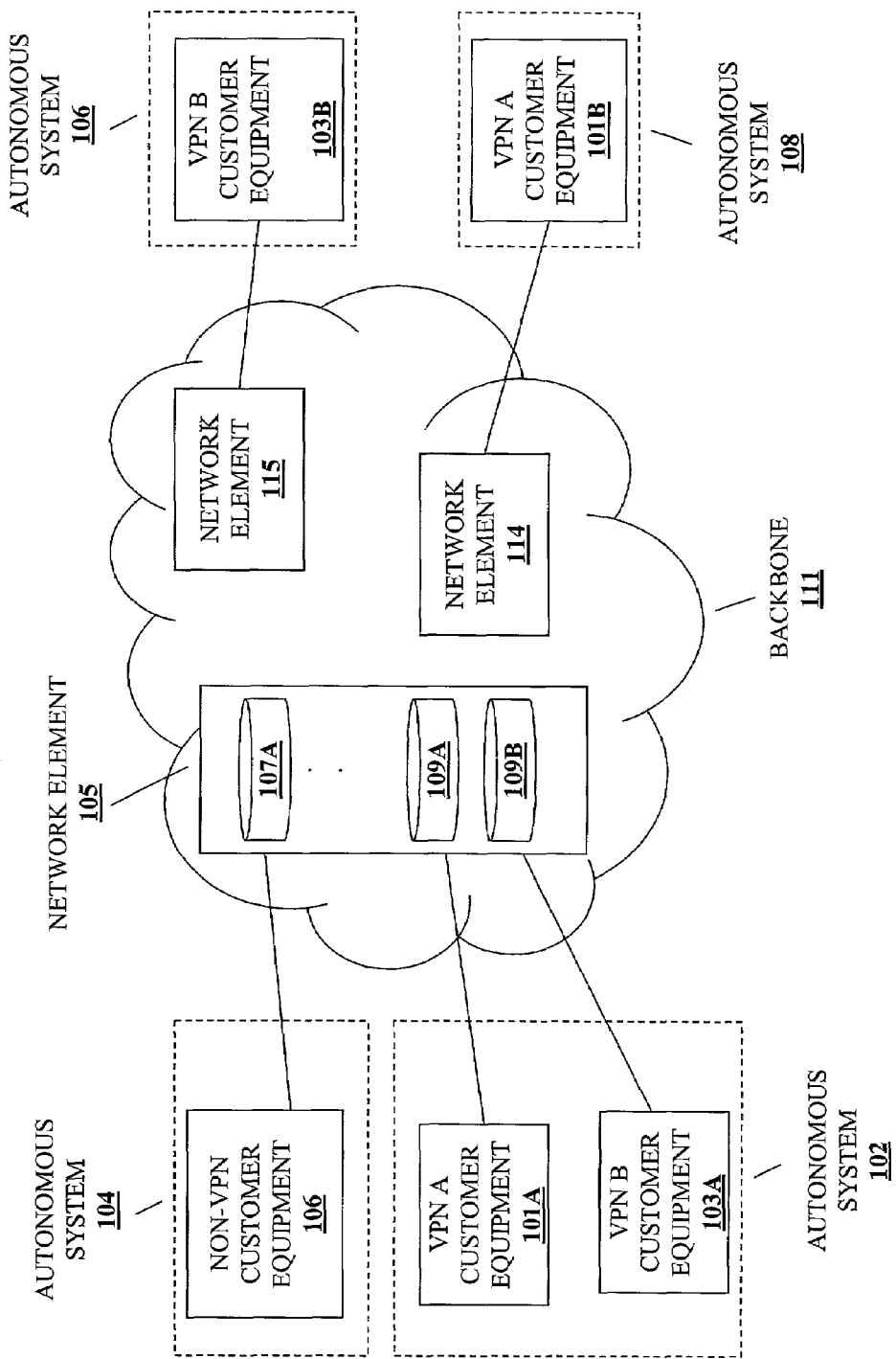
FIG. 1 is a diagram of an exemplary network according to one embodiment of the invention.

FIG. 1 is a diagram of an exemplary network according to one embodiment of the invention. In FIG. 1, a virtual private network (VPN) A includes a VPN A customer equipment 101A and a VPN A customer equipment 103A. A VPN B includes a VPN B customer equipment 101B and a VPN B customer equipment 103B. The VPN A customer equipment 101A and the VPN B customer equipment 103A are located within an autonomous system (AS) 102 in FIG. 1, but could be located in different ASs. The VPN A customer equipment 101A and the VPN B customer equipment 103A are coupled with a network element 105. The network element 105 is also coupled with a non-VPN customer equipment 106 that is located within an AS 104. The network element 105 is located in an AS that is a backbone 111.

A network element 115 is also located within the backbone 111. The network element 115 is coupled with the VPN B customer equipment 103B. A network element 114, also located in the backbone 111, is coupled with the VPN A customer equipment 101B. The VPN B customer equipment 103B and the VPN A customer equipment 101B are respectively located within an AS 106 and an AS 108.

The network element 105 includes a context 107A and VPN contexts 109A-109B. The term context is used herein to refer to a set of information and/or collection of data structures for a customer of a network provider's network element. In the exemplary network illustrated in FIG. 1, the VPN A customer equipment 101A, the VPN B customer equipment 103A, and the non-VPN customer equipment 106 gain access to the backbone 111 via the network element 105. In FIG. 1, the context 107A has been created by the network provider that owns the network element 105 for the non-VPN customer. The context 109A has been created by the network provider for the VPN A customer. The context 109B has been created by the network provider for the VPN B customer.

From the perspective of the network element 105, a customer is an entity that corresponds to a single context within the network element. However, a single entity may correspond to multiple contexts. A single entity may have multiple VPN contexts configured on the network element 105 and a context configured on the network element 105. For example, one entity may own and/or operate the non-VPN customer equipment 106, the VPN A customer equipment 101A, and the VPN B customer equipment 103A. In another example, a first entity owns and/or operates the VPN B customer equipment 103A and a second entity owns the VPN A customer equipment 101A and the non-VPN customer equipment 106. In yet another example, a first entity owns the VPN A customer equipment 101A and the VPN B customer equipment 103A, while a second entity owns and/or operates the non-VPN customer equipment 106.

The VPN context 109A includes information and/or data structures for the VPN A. Traffic received from the VPN A site 101A is processed in accordance with the VPN context 109A. The VPN context 109B includes information and/or data structures for the VPN B. Traffic received from the VPN B site 103A is processed in accordance with the VPN context 109B. Traffic is transmitted between the VPN A sites 101A and 101B in accordance with the VPN context 109A. Traffic is transmitted between the VPN B sites 103A and 103B in accordance with the VPN context 109B. Traffic received from the service provider network element 106 is processed in accordance with the context 107A.

Contexts enable isolation of traffic processed by the network element. Contexts also provide the network provider with the ability to give access to a given customer's information while restricting access to other information within the network element (e.g., a different customer's information). The context 107A includes a set of information for the service provider that owns the service provider network element 106. The owner of the service provider may be an Internet Service Provider (ISP), Application Service Provider (ASP), etc. in one embodiment, a network administrator for the service provider that owns the service provider network element 106 may log into the network element 105 and access and modify the context 107A, if permitted by the owner of the network element 105. The network element 105 may include additional contexts not illustrated.

Implementing VPNs at layer 3 provides numerous advantages. Layer 3 VPNs provide vast scalability and avoids administrative costs of tunnel configurations for layer 2 VPNs. Combining layer 3 VPNs with multiple contexts provides a powerful tool for servicing various customers that may include VPN customers and non-VPN customers. A network element supporting multiple contexts and layer 3 VPNs can support a large number of VPN customer and non-VPN customers and provide each customer access to their context.

Figure 2A:
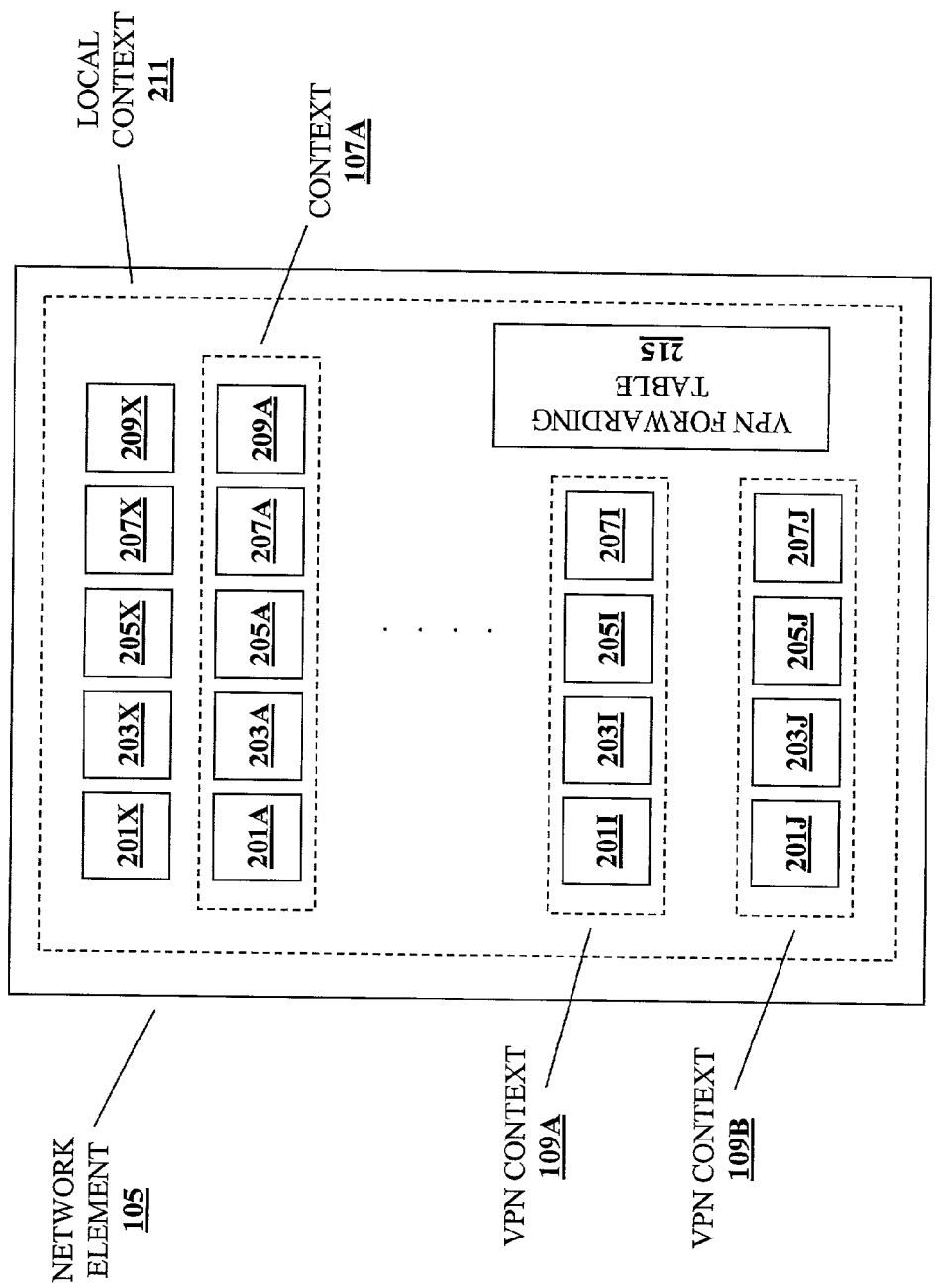
FIG. 2A is a diagram of an exemplary network element that supports multiple contexts and layer 3 VPNs according to one embodiment of the invention.

FIG. 2A is a diagram of an exemplary network element that supports multiple contexts and layer 3 VPNs according to one embodiment of the invention. FIG. 2 illustrates the network element 105 illustrated in FIG. 1. FIG. 2, also illustrates the context 107A and the VPN context 109A and 109B illustrated in FIG. 1. The context 107A includes a peer data structure 201A, a configuration data structure 203A, a routing table 205A, an interior gateway protocol (IGP) table 207A, and an exterior gateway protocol (EGP) table 209A. The term table is a conventional term and not meant to be limiting upon the type of data structure. A table can be implemented with different data structures such as a hash table, search tree, combinations of data structures, etc.

The peer structure 201A includes data describing a peer. A peer is another network element that exchanges routing information with the network element 105. A peer can either be an internal peer or an external peer. An internal peer is a network element directly connected to the network element 105 that is located within the same autonomous system as the network element 105. An autonomous system is a collection of network elements under a single administrative authority that routes traffic in accordance with a common IGP (e.g., OSPF, IS-IS, RIP, etc.). An external peer of the network element 105 is a network element that is directly connected to the network element 105, but is located in a different autonomous system. The peer structure 201A may include a peer's network address and configuration information providing guidelines for communications between the peer and the network element 105.

The configuration structure 203A includes configurations specifically for the context 107A. The configurations in the configuration structure 203A may be entered by a network administrator of the network element 105 or the administrator for the owner of the context 107A. The routing table 205A is a routing table specifically for the context 107A. The routing table 205A is used to process traffic transmitted and received for the context 107A. The IGP table 207A is a forwarding table specifically for the context 107A. The IGP table 207A may be an OSPF forwarding table, a RIP forwarding table, an ISIS forwarding table, etc. The exterior gateway protocol forwarding table 209A is a forwarding table with routes specifically for the context 107A maintained by an EGP process (e.g., BGP, etc.). As previously stated, the owner of the context 107A can be given permission by the owner of the network element 105 to view and manipulate information for the context 107A.

Since the number of entries in a table for a non-VPN customer is typically large, separation of tables for non-VPN customers provides for efficient maintenance of the non-VPN tables. Since the number of entries in a VPN table are typically fewer than the number of entries in VPN tables, sharing a single EGP table for multiple VPNs provides for efficient walking of the shared VPN tables as describe in more detail later herein.

Various embodiments of the invention may implement the EGP tables, IGP tables, and routing tables differently. For example, one embodiment may maintain a single EGP table for non-VPN contexts and a single EGP table for layer 3 VPN contexts. Another embodiment may maintain a single IGP table for VPN contexts.

The VPN context 109A includes a peer structure 201L a configuration structure 203I, a routing table 205I, and an IGP table 207I. Similarly, the VPN context 109B includes a peer structure 201J, a configuration structure 203J, a routing table structure 205J, and an IGP table 207J. The information included in the structures 201I and 203I and the tables 205I and 207I are similar to the structures 201A and 203A and the tables 205A and 207A, but are specific to the VPN context 109A. Likewise, the structures 201J and 203J and the tables 205J and 207J are specific to the VPN context 109B. As previously stated, the owners of the VPN context 109A and 109B can respectively access and configure the structures and tables in the VPN contexts 109A and 109B. Unlike the context 107A, the VPN contexts 109A and 109B do not have specific EGP tables. Instead, the VPN contexts 109A and 109B share a layer 3 VPN EGP table 215. The layer 3 VPN EGP table 215 includes EGP forwarding information for all VPN contexts in the network element 105.

In addition to the context 107A and the VPN contexts 109A and 109B, in one embodiment the network element 105 includes a local context 211. A peer structure 201X, a configuration structure 203X, a routing table 205X, an IGP table 207X, and an EGP table 209X contain information for the local context 211. The information included in the structure 201X and the tables 205X, 207X, and 209X is similar to the information included in the structure 201A and the tables 205A, 207A, and 209A, but is specific to the local context 211. The configuration structure 203X includes global configuration information (e.g., system time). Unlike the context 107A and the VPN contexts 109A and 109B, in one embodiment the owner of the local context 211, who is the owner of the network element 105, has access to many of the structures and tables of the contexts on the network element 105.

Figure 2B:
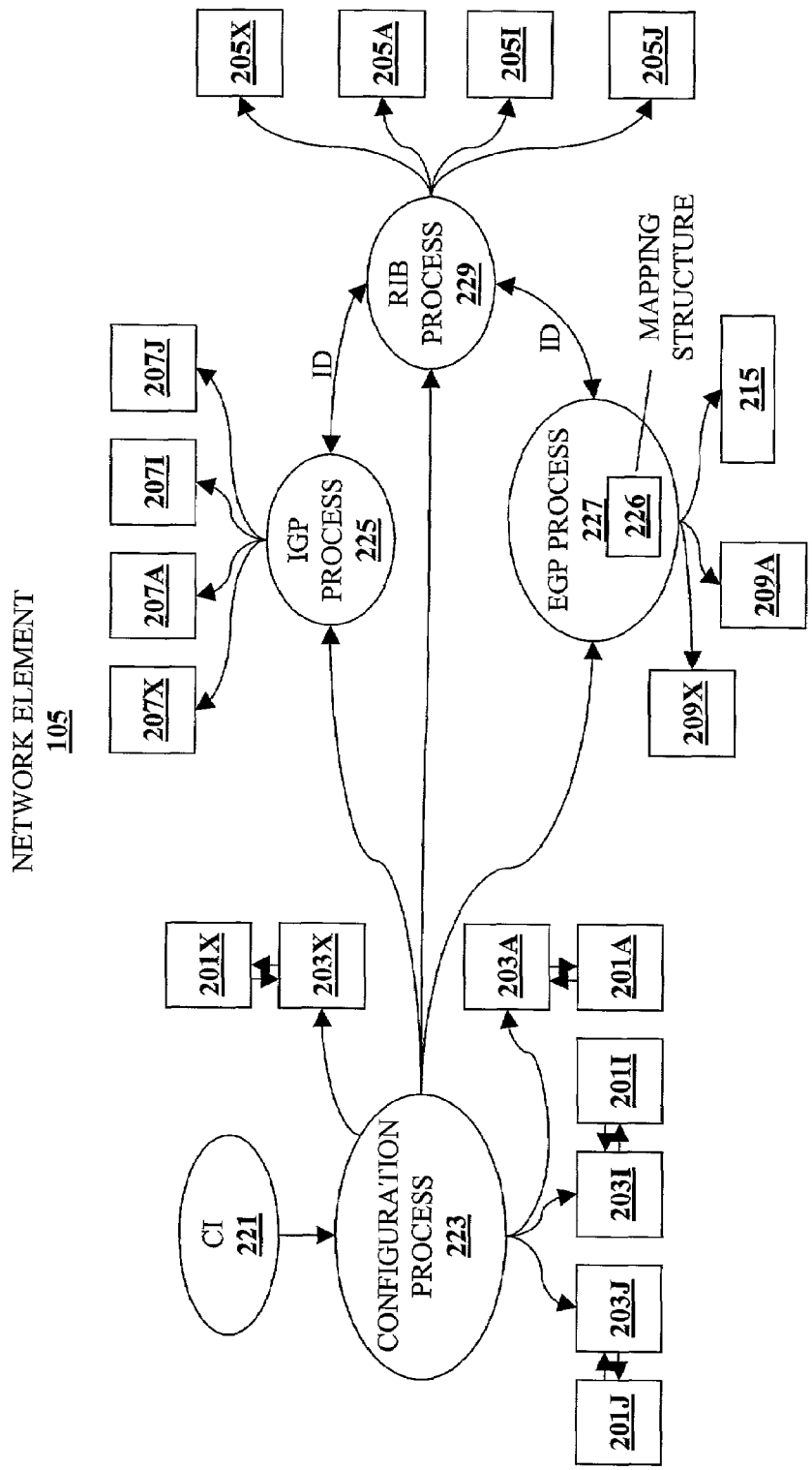
FIG. 2B is a diagram of the exemplary network element 105 illustrating a relationship between network processes and the structures and tables illustrated in FIG. 2A according to one embodiment of the invention.

FIG. 2B is a diagram of the exemplary network element 105 illustrating a relationship between network processes and the structures and tables illustrated in FIG. 2A according to one embodiment of the invention. In FIG. 2B, a configuration interface (CI) 221 feeds configuration information into a configuration process 223. The CI may be a command line interface or a graphical user interface for entering configurations and commands for the network element 105. The configuration process 223 stores the configurations into one of the configuration structures 203X, 203A, 203I, and 203J. The configuration structures 203X, 203A, 203I, and 203J are illustrated in FIG. 2B as referencing the peer structures 201X, 201A, 201I, and 201J. The relationships are illustrated as follows: the peer structure 201J and the configuration structure 203J; the peer structure 201I and the configuration structure 203I; the peer structure 201A and the configuration structure 203A; and the peer structure 201X and the configuration structure 203X.

The peer structures may be implemented in a variety of ways. In one embodiment, a single peer structure has entries for all peers configured on a given network element. In such an embodiment, each entry identifies a peer and its corresponding context. In another embodiment, each peer configured on the given network element is allocated a single peer structure. In another embodiment, a single peer structure is allocated for each context configured on the network element.

The configuration process 223 also sends configurations to an IGP process 225, a RIB process 229, and an EGP process 227. The IGP process 225 represents one or more IGP processes that may include the following protocols: RIP, OSPF, IS-IS, etc. The EGP process 227 also represents one or more processes that may include BGP and other exterior gateway protocols. The IGP process 225 maintains the IGP tables 207X, 207A, 207I, and 207J. The RIB process 229 maintains the routing tables 205X, 205A, 205I, and 205J. The EGP process 227 maintains the EGP table 209X, 209A, the layer 3 VPN EGP table 215, and a mapping structure 226.

In an embodiment that provides for a single non-VPN EGP table and a single VPN EGP table, an identifier (e.g., context ID) is included in each entry of the single non-VPN EGP table. In another embodiment that provides for single non-VPN EGP table and a single VPN EGP table, each entry of the non-VPN EGP table indicates an identifier (e.g., context ID) and references a set of prefixes corresponding to the identifier.

The mapping structure 226 is a data structure that includes VPN context IDs and their corresponding RD. The mapping structure 226 may be implemented as a tree, hash table, linked list, etc. When the IGP process 225 downloads updates of one of the IGP tables, such as the IGP table 207X, the IGP process 225 passes the context ID indicated in the IGP table 207X to the RIB process 229. The EGP process 227 does the same for non-VPN EGP tables. However, the layer 3 VPN EGP table 215 does not correspond to a single context. Therefore, the EGP process 227 uses the mapping structure 226 to communicate with other processes in the network element 105 for communications related to VPN contexts. Communications with other processes may include passing updates to the RIB process 229, performing requests from the configuration process 223, etc.

Sharing a single EGP table for all of the VPN contexts of a network element improves the efficiency of update message generation for the network element supporting multiple contexts and layer 3 VPNs. Since the number of entries for an individual VPN customer is relatively small, combining entries for all layer 3 VPN customers into a single EGP table enables an EGP process to efficiently walk the combined data structure instead of numerous small EGP tables. In addition, a mapping structure enables efficient maintenance of the combined EGP table without extensive memory consumption.

Figure 2C:
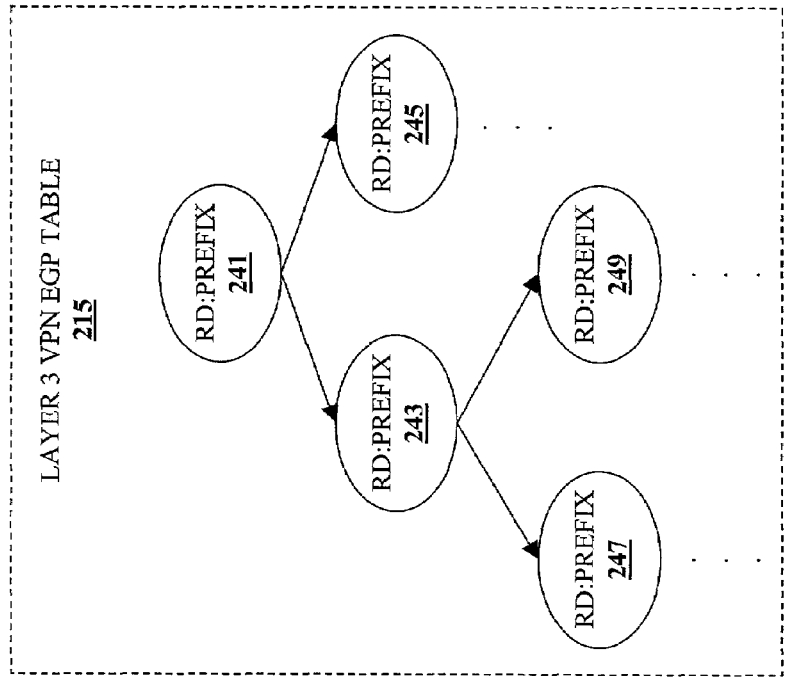
FIG. 2C is a diagram of the layer 3 VPN EGP table 215 as a tree according to one embodiment of the invention.
Figure 2C:
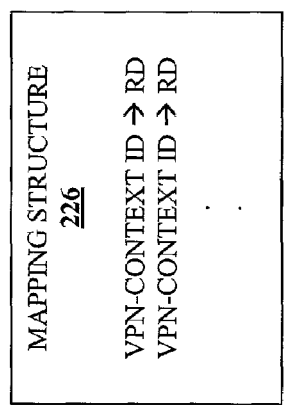

FIG. 2C is a diagram of the layer 3 VPN EGP table 215 as a tree according to one embodiment of the invention. In FIG. 2C, the layer 3 VPN EGP table is implemented as a tree. Each of the nodes 241, 243, 245, 247, and 249 are labeled with the value RD:prefix. The mapping structure 226 is also illustrated in FIG. 2C. The EGP process 227 uses the mapping structure 226 as previously discussed to send and receive communication regarding the layer 3 VPN EGP table 215. If the EGP process 227 receives a communication affecting the layer 3 VPN EGP table 215, then the EGP process 227 maps the VPN-context ID indicated in the communication to a RD with the mapping structure 216. Maintaining the mapping structure 226 avoids including a VPN context ID in every node.

Figure 2D:
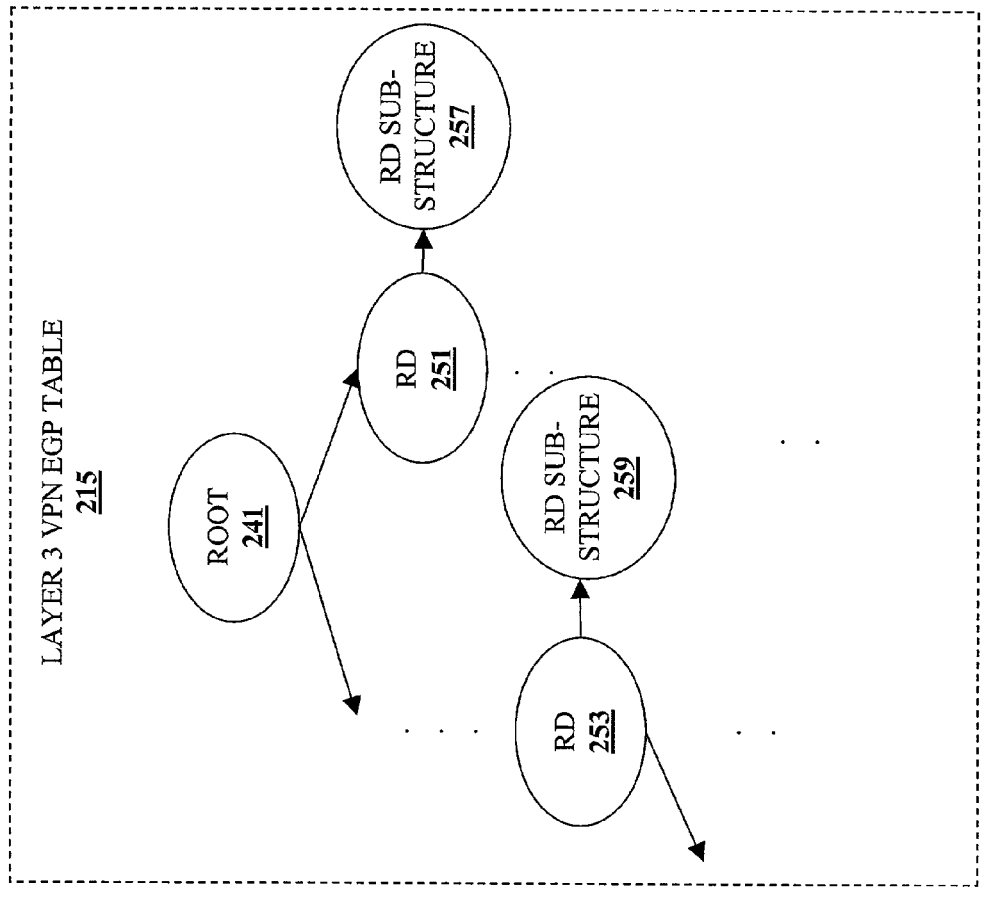
FIG. 2D is a diagram of the layer 3 VPN EGP table 215 as a tree with RD substructures according to one embodiment of the invention.
Figure 2D:
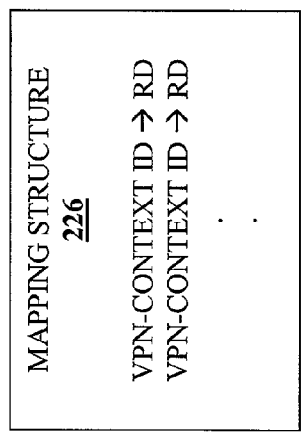

FIG. 2D is a diagram of the layer 3 VPN EGP table 215 as a tree with RD substructures according to one embodiment of the invention. Unlike the layer 3 VPN EGP table 215 illustrated in FIG. 2C, the right branch of the root node 241 references a node 251. Instead of RD:prefix, the node 251 is labeled with the route distinguisher. In addition to typical left and right branches of a tree, the node 251 references an RD substructure 257. The RD substructure 257 is a data structure that indicates prefixes corresponding to the RD identified in the node 251. A node 253 is similar to the node 251 in that it is only identified by the value RD instead of the value RD:prefix. The node 253 references an RD substructure 259. The RD substructure 259 includes prefixes corresponding to the RD identified in the node 253. The embodiment of the layer 3 VPN EGP table 215 further improves memory use. The embodiment illustrated in FIG. 2D reduces the number of nodes in the layer 3 VPN EGP table 215 with the route distinguisher value (currently defined as an 8 byte value), and group prefixes by route distinguisher. In addition, the EGP process 227 may group updates to be transmitted by RD as it encounters each node of the layer 3 VPN EGP table 215.

Figure 2E:
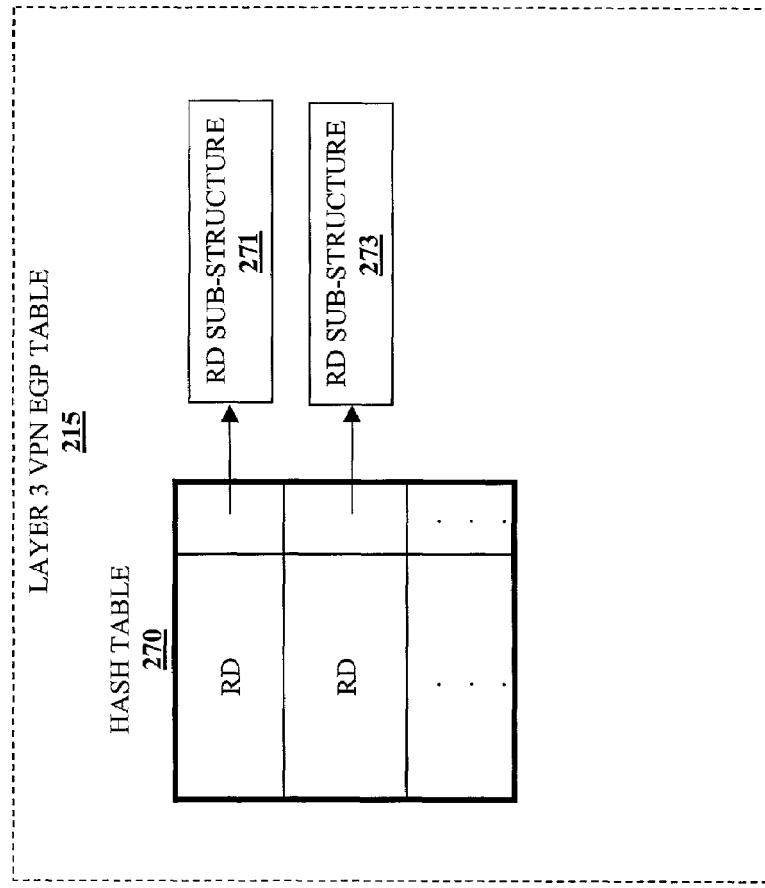
FIG. 2E is a diagram illustrating an alternative embodiment of the layer 3 VPN EGP table 215 as a hash table according to one embodiment of the invention.
Figure 2E:
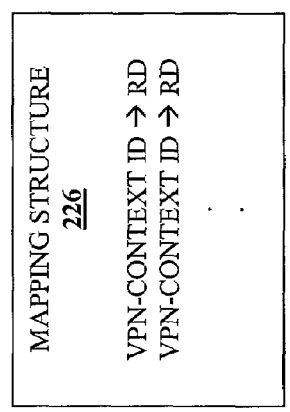

FIG. 2E is a diagram illustrating an alternative embodiment of the layer 3 VPN EGP table 215 as a hash table according to one embodiment of the invention. Each entry of the hash table 270 indicates a route distinguisher. Each entry of the hash table 260 references an RD substructure 271 or 273. As with the layer 3 VPN EGP table illustrated in FIG. 2D, the EGP process 227 may group updates by mapped VPN context ID as it walks through the hash table 260.

As illustrated in FIGS. 2C-2E, various embodiments of the invention may implement the layer 3 VPN EGP table 215 with different data structures and/or combinations of data structures.

Figure 3A:
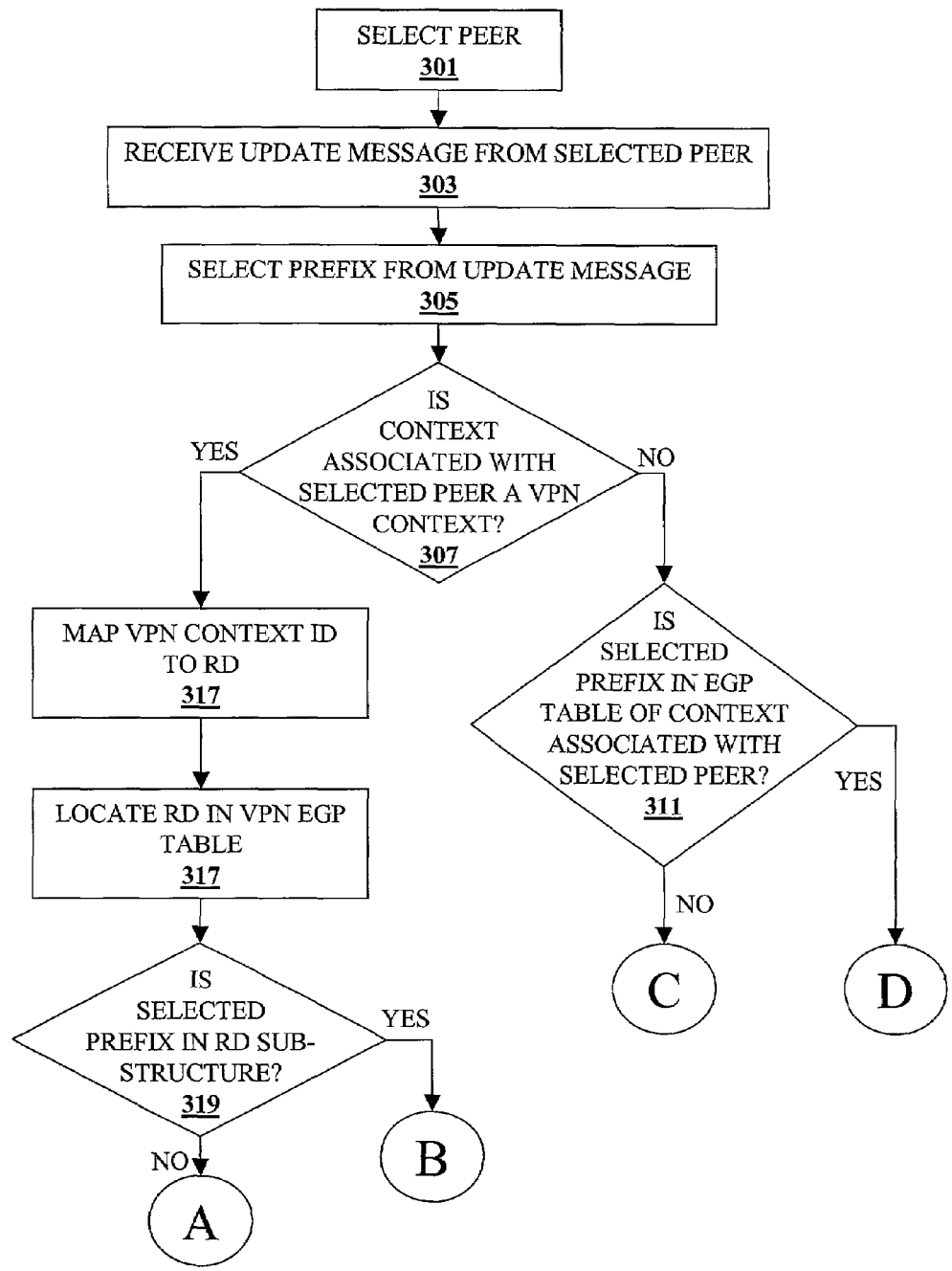
FIG. 3A is a flow chart for processing an update message received from customer with RD substructures equipment according to one embodiment of the invention.

FIG. 3A is a flow chart for processing an update message received from customer with RD substructures equipment according to one embodiment of the invention. At block 301, the EGP process 227 selects a peer that is a customer equipment. At block 303, the EGP process 227 receives an update message from the selected peer. At block 305, the EGP process 227 selects a prefix from the received update message. At block 307, the EGP process 227 determines if the context associated with the selected peer is a VPN context. If the associated context is not a VPN context, then at block 309 the EGP process 227 determines if the selected prefix is in the EGP table of the context associated with the selected peer. If the EGP process 227 determines that the selected prefix is within the associated context's EGP table, then control flows to block 313. If the EGP process 227 determines that the selected prefix is not within the associated context's EGP table, then control flows to block 315.

If at block 309 the EGP process 227 determines that the context associated with the selected peer is a VPN context, then at block 317 the EGP process 227 maps the VPN context ID of the associated context to a route distinguisher (RD). At block 318 the EGP process 227 locates the RD in the layer 3 VPN EGP table 215. At block 319, the EGP process 227 determines if the selected prefix is in the located RD sub-structure. If the EGP process 227 determines that the selected prefix is within the RD sub-structure, then control flows to block 323. If the EGP process 227 determines that the selected prefix is not within the located RD sub-structure, then control flows to block 321.

Figure 3B:
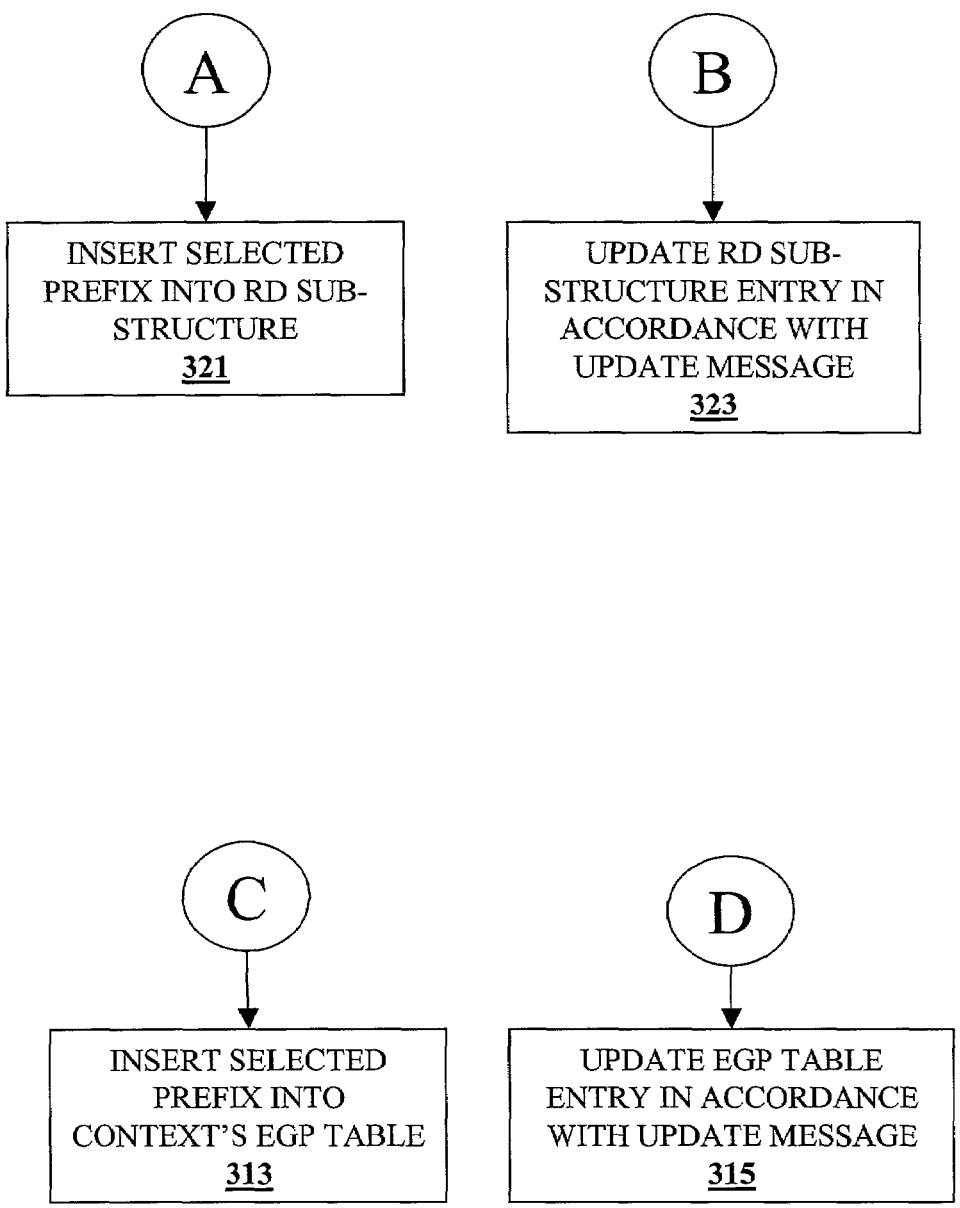
FIG. 3B is a flow chart continuing from the flow chart of FIG. 3A according to one embodiment of the invention.

FIG. 3B is a flow chart continuing from the flow chart of FIG. 3A according to one embodiment of the invention. At block 313, the EGP process 227 inserts the selected prefix into the selected context EGP table. At block 315, the EGP process 227 updates an entry matching the selected prefix of the associated context's EGP table in accordance with the update message. At block 321, the EGP process 227 inserts a selected prefix into the located RD substructure. At block 323, the EGP process 227 updates an entry matching the selected prefix within the located RD substructure in accordance with the update message.

Figure 4A:
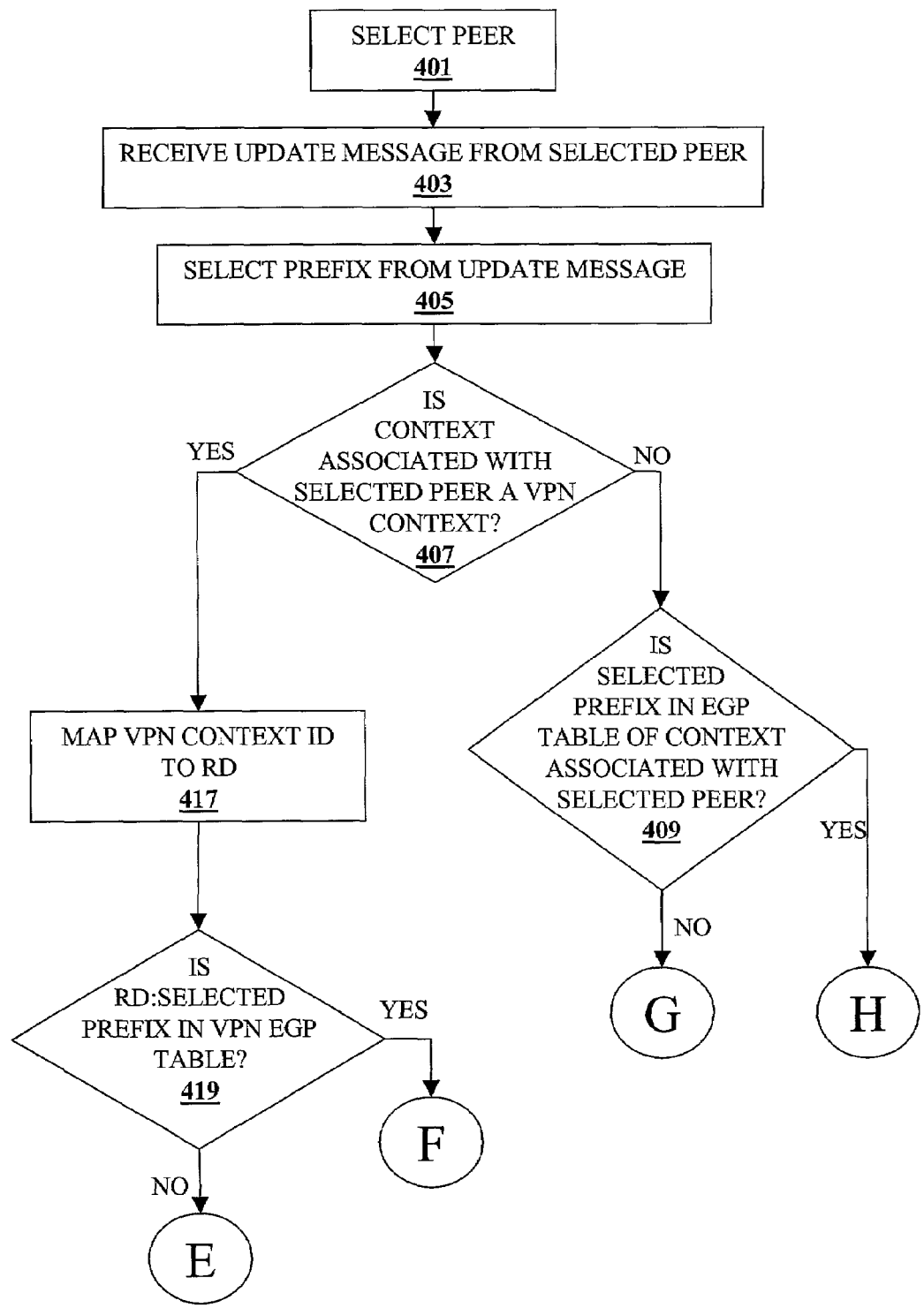
FIG. 4A is a flow chart for processing an update message received from customer equipment according to one embodiment of the invention.

FIG. 4A is a flow chart for processing an update message received from customer equipment according to one embodiment of the invention. At block 401, the EGP process 227 selects a peer that is a customer equipment. At block 403, the EGP process 227 receives an update message from the selected peer. At block 405, the EGP process 227 selects a prefix from the received update message. At block 407, the EGP process 227 determines if the context associated with the selected peer is a VPN context. If the associated context is not a VPN context, then at block 409 the EGP process 227 determines if the selected prefix is in the EGP table of the context associated with the selected peer. If the EGP process 227 determines that the selected prefix is within the associated context's EGP table, then control flows to block 415. If the EGP process 227 determines that the selected prefix is not within the associated context's EGP table, then control flows to block 413.

If at block 407, the EGP process 227 determines that the selected context is a VPN context, then at block 417 the EGP process 227 maps the VPN context ID of the associated context to a (RD). At block 419 the EGP process 227 determines if the RD:selected prefix is within the layer 3 VPN EGP table 215. If the RD:selected prefix is within the later 3 VPN EGP table, then control flows to block 423. If the RD:selected prefix is not within the layer 3 VPN EGP table, then control flows to block 421.

Figure 4B:
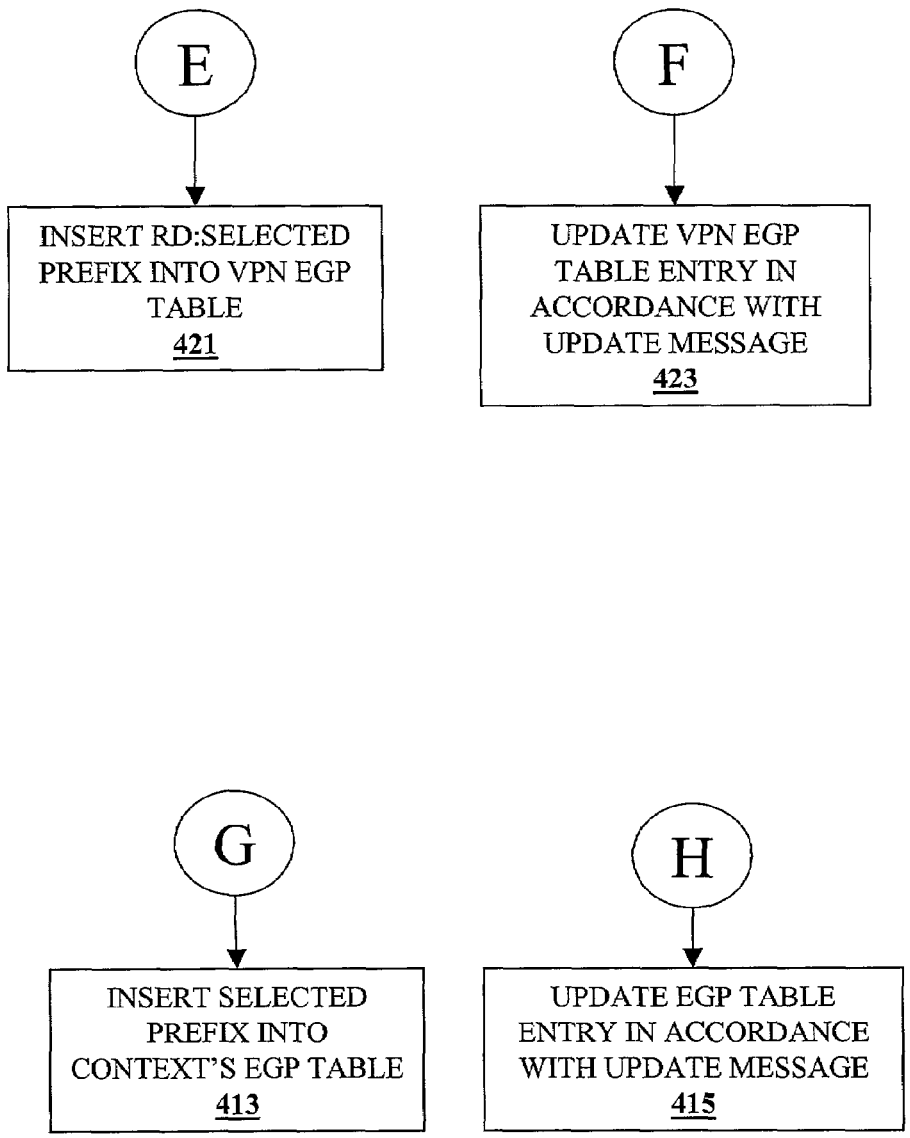
FIG. 4B is a flow chart continuing from the flow chart illustrated in FIG. 4A according to one embodiment of the invention.

FIG. 4B is a flow chart continuing from the flow chart illustrated in FIG. 4A according to one embodiment of the invention. At block 421, the EGP process 227 inserts RD: selected prefix into the layer 3 VPN EGP table 215. At block 423, the network element updates an entry matching the selected prefix in the layer 3 VPN EGP table in accordance with the update message. At block 413, the EGP process 227 inserts the selected prefix into the associated context's EGP table. At block 415, the EGP process 227 updates an entry matching a selected prefix in the associated context's EGP table in accordance with the update message.

Figure 5:
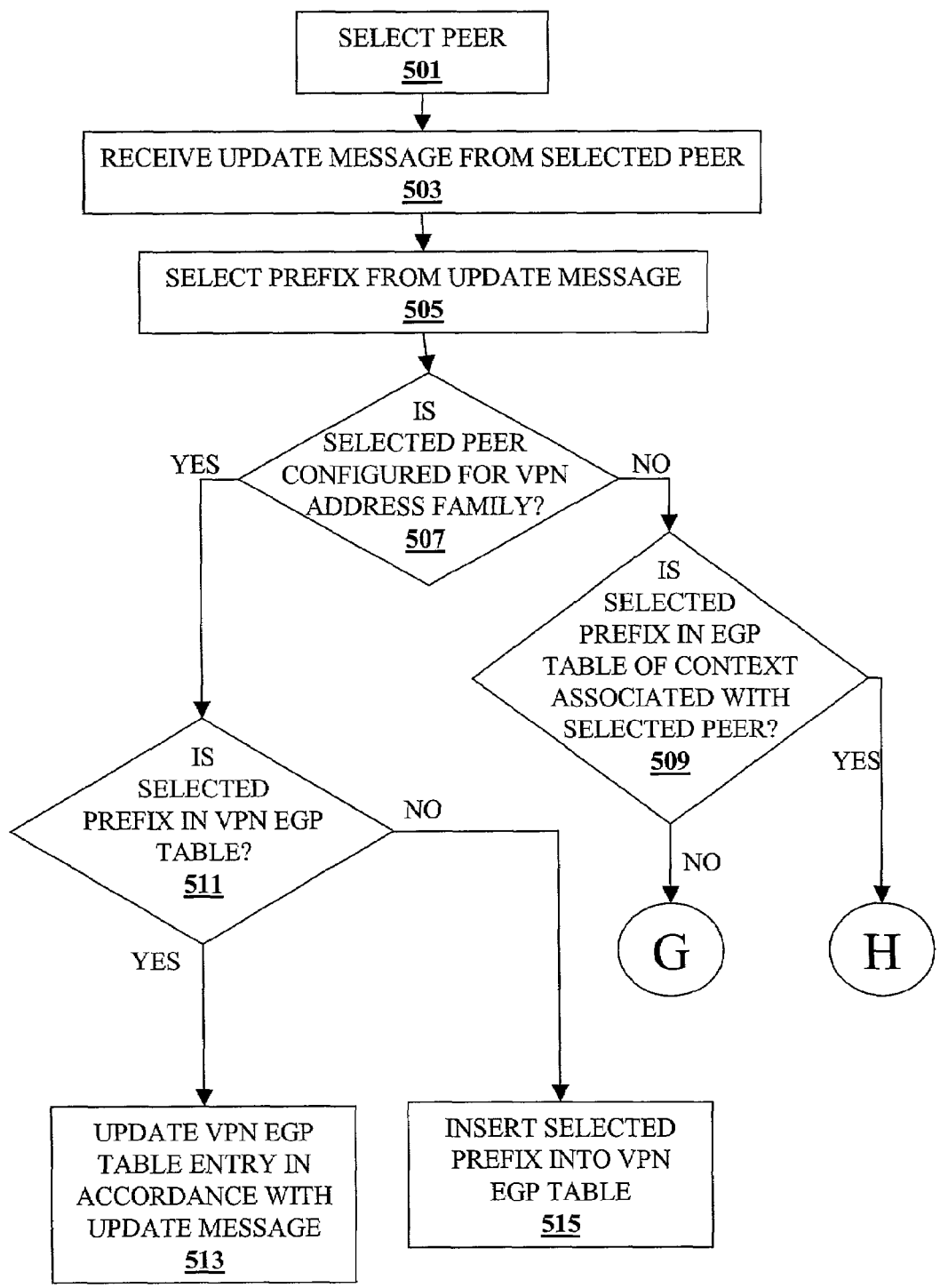
FIG. 5 is flow chart for processing an update message received from a provider equipment according to one embodiment of the invention.

FIG. 5 is flow chart for processing an update message received from a provider equipment according to one embodiment of the invention. At block 501, the EGP process 227 selects a peer that is a customer equipment. At block 503, the EGP process 227 receives an update message from the selected peer. At block 505, the EGP process 227 selects a prefix from the received update message. At block 507, the EGP process 227 determines if the selected peer is configured for the VPN address family. If the selected peer is not configured for the VPN address family, then at block 509 the EGP process 227 determines if the selected prefix is in the EGP table of the context associated with the selected peer. If the EGP process 227 determines that the selected prefix is within the associated context's EGP table, then control flows to control flows to block 415 of FIG. 4B. If the EGP process 227 determines that the selected prefix is not within the associated context's EGP table, then control flows to block 413 of FIG. 4B.

If at block 507, the EGP process 227 determines that the selected peer is not configured for the VPN address family, then at block 511 the EGP process 227 determines if the selected prefix matches an entry in the layer 3 VPN EGP table 215. If the selected prefix does not match an entry in the VPN EGP table 215, then at block 515 the EGP process 227 inserts the select prefix into the layer 3 VPN EGP table 215. If the selected prefix matches an entry in the layer 3 VPN EGP table 215, then at block 513 the EGP process 227 updates the matching entry in accordance with the update message.

Figure 6:
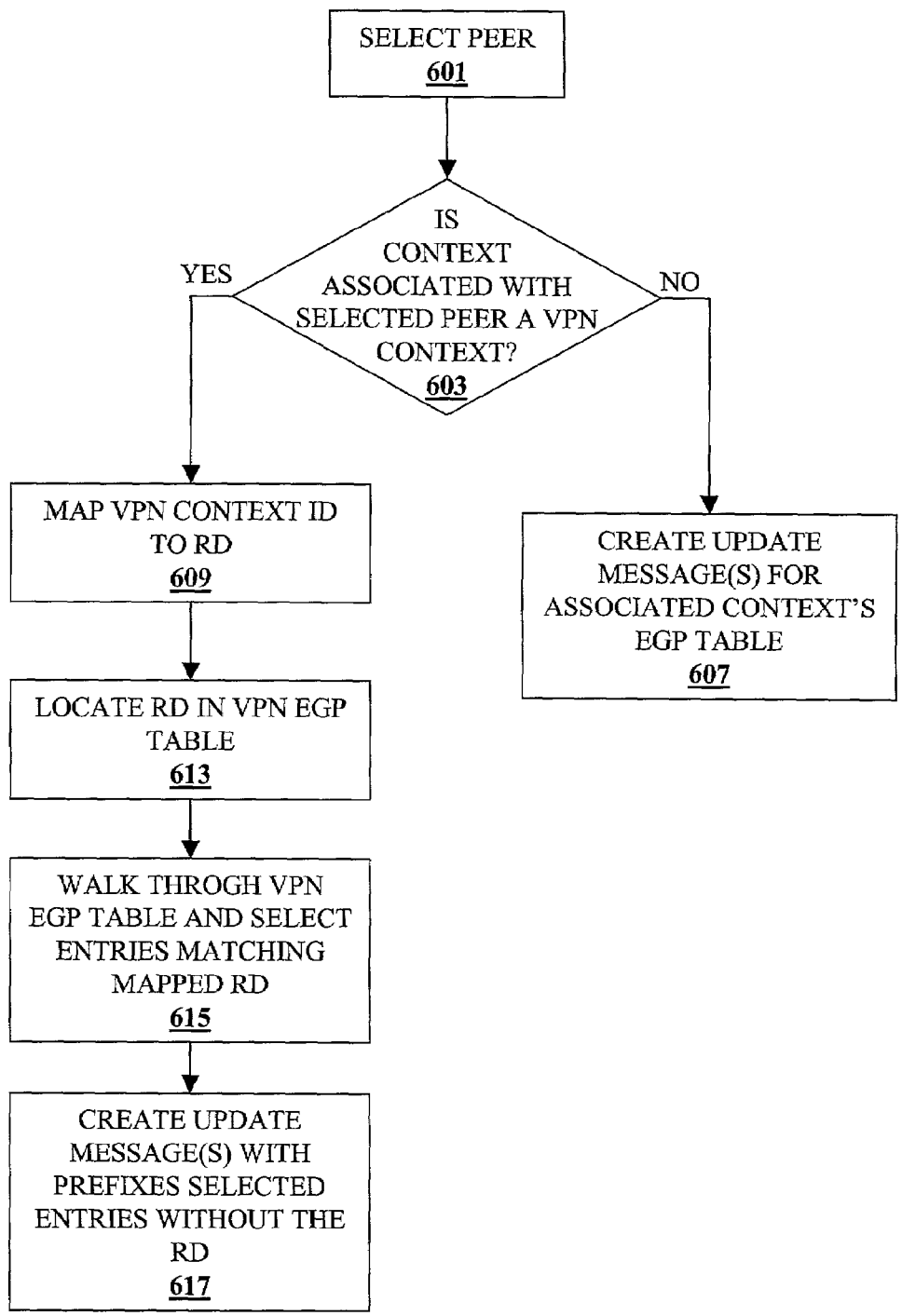
FIG. 6 is a flow chart for generating an update message for customer equipment according to one embodiment of the invention.

FIG. 6 is a flow chart for generating an update message for customer equipment according to one embodiment of the invention. At block 601, the EGP process 227 selects a peer. At block 603, the EGP process 227 determines if the context associated with the selected peer is a VPN context. If the associated context is not a VPN context, then at block 607, the EGP process 227 creates an update message(s) for the associated context's EGP table. If the EGP process 227 determines at block 603 that the associated context is a VPN context, then at block 609 the EGP process 227 maps the VPN context ID of the associated VPN context to an RD. At block 613, the EGP process 227 locates the RD in the VPN EGP table 215. At block 615, the EGP process 227 walks through the VPN EGP table and select entries matching the mapped RD. At block 617, the EGP process 227 creates an update message(s) with prefixes of selected entries without the RD.

Figure 7:
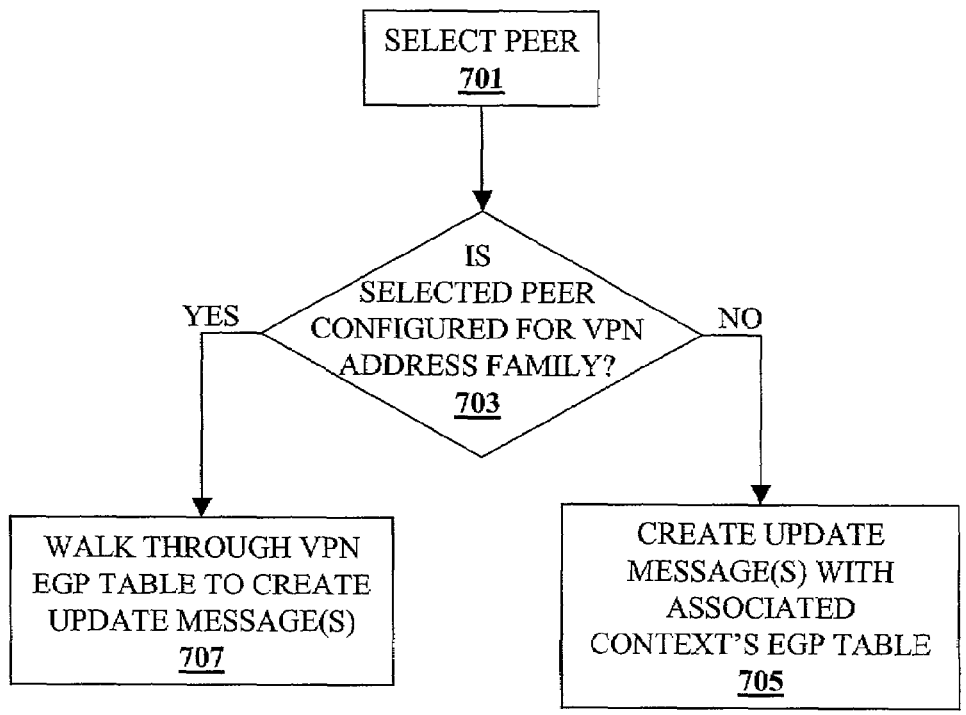
FIG. 7 is a flow chart for generating an update message for a provider equipment according to one embodiment of the invention.

FIG. 7 is a flow chart for generating an update message for a provider equipment according to one embodiment of the invention. At block 701, the EGP process 227 selects a peer. At block 703, the EGP process 227 determines if the selected peer is configured for the VPN address family. If the selected peer is not configured for the VPN address family, then the EGP process 227 creates an update message(s) with the associated context's EGP table at block 705. If the selected peer is not configured for the VPN address family, then the EGP process 227 walks through the layer 3 VPN EGP table 215 to create update message(s) at block 707.

While the flow diagrams in the Figures show a particular order of operations performed by certain embodiments of the invention, it should be understood that such order is exemplary (e.g., alternative embodiments may perform certain of the operations in a different order, combine certain of the operations, perform certain of the operations in parallel, etc.).

Figure 8:
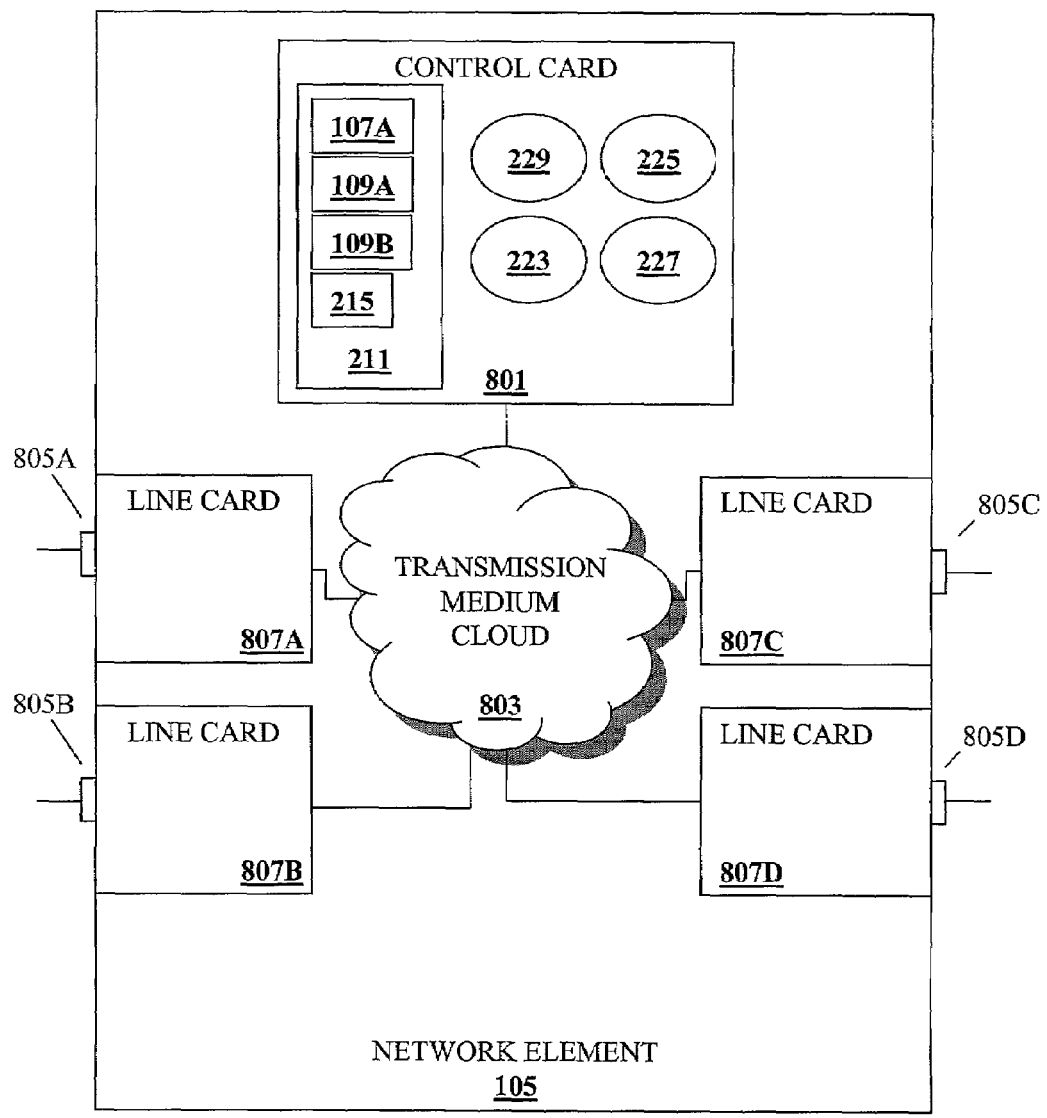
FIG. 8 is a block diagram illustrating the exemplary network element 105 according to one embodiment of the invention.

FIG. 8 is a block diagram illustrating the exemplary network element 105 according to one embodiment of the invention. In FIG. 8, a control card 801 hosts the local context 211, the VPN context 109A, the VPN context 109B, the context 107A, and the Layer 3 VPN EGP table 215, the configuration process 223, the IGP process 225, the EGP process 227, and the RIB process 229. In various embodiments of the invention, the local context 211, the VPN context 109A, the VPN context 109B, the context 107, and the Layer 3 VPN EGP table 215, the configuration process 223, the IGP process 225, the EGP process 227, and the RIB process 229 may be hosted on a co-processor, an ASIC, etc. In alternative embodiments, the structures and tables of the context 107A and VPN contexts 109A and 109B may be stored on a storage device and/or memory coupled with the control card 801.

The control card 801 is coupled with a transmission medium cloud 803 (e.g., a system bus, a mesh, a system bus and a mesh, etc.). The transmission medium cloud 803 is coupled with line cards 807A-807D. The line cards 807A-807D are coupled to physical interfaces 809A-809D respectively. The network element 105 receives updates messages and transmits update messages via the physical interfaces 805A-805D.

The control card 801 and the line cards 807A-807D illustrated in FIG. 8 includes memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

A network element supporting multiple contexts and layer 3 VPNs provides the owner of the network element the ability to support VPNs for multiple customers at a cost lower than the cost of layer 2 VPNs and more efficiently than without multiple contexts. The owner can provide customers access to their own context. Providing access to contexts can be offered as a service and shifts some administrative tasks from the network element owner to it's customers. Hence, the network element owner can provide layer 3 VPNs to multiple VPN customers (e.g. corporations, service providers, education institutions, etc.) and backbone access to non-VPN customers. The network element owner can serve this variety of customers from a single network element while offering administrative access to the network element through multiple contexts.

The method and apparatus of the invention can be practiced with modification and alteration within the spirit and scope of the appended claims. The description is thus to be regarded as illustrative instead of limiting on the invention.

We claim:

1. A computer implemented method comprising:
maintaining a first set of information for a first layer 3 virtual private network (VPN) context, the first set of information for including a first value identifying the first layer 3 VPN context;
separately maintaining a second set of information for a second layer 3 VPN context, the second set of information for including a second value identifying the second layer 3 VPN context, wherein the first and second sets of information corresponds to a first and second customers accessing a backbone and maintained within a single network element of the backbone, and wherein the first and second sets of information include sufficient information to establish the first and second layer 3 VPNs contexts with other network elements of the backbone for the first and second customer respectively;
associating the first value with a first route distinguisher;
associating the second value with a second route distinguisher;
maintaining on a single network element a single exterior gateway protocol (EGP) table for the first and second layer 3 VPN contexts wherein the single EGP table comprises EGP forwarding entries for the first and second layer 3 VPN contexts;
maintaining a data structure for the single EGP table, the data structure indicating the association between first value and the first route distinguisher and between the second value and the second route distinguisher;
performing mappings between the first value and the first route distinguisher and between the second value and the second route distinguisher with the data structure;
maintaining on the single network element a separate VPN context specific first routing table and a first interior gateway protocol (IGP) table, for the first layer 3 VPN context, wherein the first IGP table comprises IGP forwarding entries for the first layer 3 VPN context and the first routing table comprises the IGP and EGP forwarding entries for the first layer 3 VPN, and wherein the maintaining the first routing table includes downloading to the first routing table the first layer 3 VPN context specific entries from the single EGP table and the first IGP table, wherein the downloading to the first routing table of the first layer 3 VPN context EGP forwarding entries from the single EGP table uses the data structure; and
maintaining on the single network element a separate VPN context specific second routing table and a second IGP table for the second layer 3 VPN context, wherein the second IGP table comprises IGP forwarding entries for the second layer 3 VPN context and the second routing table comprises IGP and EGP forwarding entries for the second layer 3 VPN, and wherein the maintaining the second routing table includes downloading to the second routing table the second layer 3 VPN context specific entries from the single EGP table and the second IGP table, wherein the downloading to the second routing table of the second layer 3 VPN context EGP forwarding entries from the single EGP table uses the data structure.

2. The computer implemented method of claim 1 further comprising:
separately maintaining a third set of information for a non-VPN customer, the third set of information for including a third value identifying the non-VPN customer; and
maintaining a second EGP table for the non-VPN customer.

3. The computer implemented method of claim 1 further comprising:
associating the first value with a first route distinguisher;
updating a set entries for the first layer 3 VPN context in the single EGP table, each of the set of entries indicating the first route distinguisher;
mapping the first route distinguisher to the first value; and
indicating the mapped first value in communication about the updated set of entries.

4. A machine-readable storage medium that stores instructions, which when executed by a set of one or more processors, cause said set of one or more processors to perform operations comprising:
maintaining a set of information for a first layer 3 virtual private network (VPN) context, the first set of information for including a first value identifying the first layer 3 VPN context;
separately maintaining a second set of information for a second layer 3 VPN context, the second set of information for including a second value identifying the second layer 3 VPN context, wherein the first and second sets of information corresponds to a first and second customers accessing a backbone and maintained within a single network element of the backbone, and wherein the first and second sets of information include sufficient information to establish the first and second layer 3 VPN contexts with other network elements of the backbone for the first and second customer respectively;

associating the first value with a route distinguisher (RD);

associating the second value with a second RD;

maintaining a data structure single exterior gateway protocol (EGP) to perform mappings between the first value and the first RD and between the second value and the second RD;

performing mapping between the first value and the first RD and between the second value and the second RD with the data structure;

maintaining on a single network element the single EGP, table for the first and second layer 3 VPN contexts, wherein the single EGP, table comprises EGP forwarding entries for the first and second layer 3 VPN contexts;

maintaining on the single network element a separate VPN context specific first routing table and a first interior gateway protocol (IGP) table, for the first layer 3 VPN context, wherein the first IGP table comprises IGP forwarding entries for the first layer 3 VPN context and the first routing table comprises the IGP and EGP forwarding entries for the first layer 3 VPN, and wherein the maintaining the first routing table includes downloading to the first routing table the first layer 3 VPN context specific entries from the single EGP table and the first IGP table, wherein the downloading to the first routing table of the first layer 3 VPN context EGP forwarding entries from the single EGP table uses the data structure; and maintaining on the single network element a separate VPN context specific second routing table and a second IGP table for the second layer 3 VPN context, wherein the second IGP table comprises IGP forwarding entries for the second layer 3 VPN context and the second routing table comprises IGP and EGP forwarding entries for the second layer 3 VPN, and wherein the maintaining the second routing table includes downloading to the second routing table the second layer 3 VPN context specific entries from the single EGP table and the second IGP table, wherein the downloading to the second routing table of the second layer 3 VPN context EGP forwarding entries from the single EGP table uses the data structure.

5. The machine-readable storage medium of claim 4 further comprising:

separately maintaining a third set of information for a non-VPN customer, the third set of information for including a third value identifying the non-VPN customer; and maintaining a second EGP table for the non-VPN customer.

6. The machine-readable storage medium of claim 4 wherein the mappings are performed for communications about the single EGP table.

7. A machine-readable storage medium that stores instructions, which when executed by a set of one or more processors, cause said set of one or more processors to perform operations comprising:

maintaining a first set of information for a first layer 3 virtual private network (VPN) context, the set of information for including a first value identifying the first layer 3 VPN context;

separately maintaining a second set of information for a second layer 3 VPN context, the second set of information including a second value identifying the second layer 3 VPN context, wherein the first and second sets of information corresponds to a first and second customers accessing a backbone and maintained within a single network element of the backbone, and wherein the first and second sets of information include sufficient information to establish the first and second layer 3 VPN contexts with other network elements of the backbone for the first and second customer respectively;

associating the first value with a first route distinguisher;

associating the second value with a second route distinguisher;

maintaining on a single network element a single exterior gateway protocol (EGP) table for the first and second layer 3 VPN contexts, wherein the single EGP table comprises EGP forwarding entries for the first and second layer 3 VPN contexts;

maintaining a data structure for the single EGP table, the data structure indicating the association between first value and the first route distinguisher and between the second value and the second route distinguisher;

performing mapping between the first value and the first route distinguisher and between the second value and the second route distinguisher with the data structure maintaining on the single network element a separate VPN context specific first routing table and a first interior protocol (IGP) table for, the first layer 3 VPN context, wherein the first IGP table comprises interior gateway protocol (IGP) forwarding entries for the first layer 3 VPN context and the first routing table comprises the IGP and EGP forwarding entries for the first layer 3 VPN, and wherein the maintaining the first routing table includes downloading to the first routing table the first layer 3 VPN context specific entries from the single EGP table and the first IGP table, wherein the downloading to the first routing table of the first layer 3 VPN context EGP forwarding entries from the single EGP table uses the data structure; and maintaining on the single network element a separate VPN context specific second routing table and a second IGP table for the second layer 3 VPN context, wherein the second IGP table comprises IGP forwarding entries for the second layer 3 VPN context and the second routing table comprises IGP and EGP forwarding entries for the second layer 3 VPN, and wherein the maintaining the second routing table includes downloading to the second routing table the second layer 3 VPN context specific entries from the single EGP table and the second IGP table, wherein the downloading to the second routing table of the second layer 3 VPN context EGP forwarding entries from the single EGP table uses the data structure.

8. The machine-readable storage medium of claim 7 further comprising:

separately maintaining a third set of information for a non-VPN customer, the third set of information including a third value identifying the non-VPN customer; and maintaining a second EGP table for the non-VPN customer.

9. The machine-readable storage medium of claim 7 further comprising:

updating a set entries for the first layer 3 VPN context in the single EGP table, each of the set of entries indicating the first route distinguisher;

mapping the first route distinguisher to the first value; and indicating the mapped first value in communication about the updated set of entries.

* * * * *